United States Patent
Tucker

(12) 
(10) Patent No.: US 6,178,519 B1
(45) Date of Patent: Jan. 23, 2001

(54) CLUSTER-WIDE DATABASE SYSTEM

(75) Inventor: Roger N. Tucker, Colo Springs, CO (US)

(73) Assignee: MCI WorldCom, Inc., Jackson, MS (US)

( * ) Notice: Under 35 U.S.C. 154(b), the term of this patent shall be extended for 0 days.

(21) Appl. No.: 09/209,053

(22) Filed: Dec. 10, 1998

(51) Int. Cl.[7] .............................. G06F 17/30; G06F 11/00
(52) U.S. Cl. .................................................. 714/4; 707/10
(58) Field of Search ................... 707/1, 5, 10, 100–104, 707/200–206; 704/8; 709/102; 712/20; 395/182.02, 182.03

(56) References Cited

U.S. PATENT DOCUMENTS

| | | | |
|---|---|---|---|
| 4,974,191 | * 11/1990 | Amirghodsi et al. | 704/8 |
| 5,179,702 | * 1/1993 | Spix et al. | 709/102 |
| 5,815,723 | * 9/1998 | Wilkinson et al. | 712/20 |
| 5,828,894 | * 6/1999 | Wilkinson et al. | 712/20 |
| 5,909,540 | * 6/1999 | Carter et al. | 395/182.02 |
| 5,918,229 | * 6/1999 | Davis et al. | 707/10 |

* cited by examiner

*Primary Examiner*—Ruay Lian Ho

(57) ABSTRACT

A cluster-wide database system includes a shared disk array (20) comprising an object oriented database (18). A plurality of nodes (10) are connected to the shared disk array (20). Each of the nodes (10) includes a copy of a portion of the object oriented database stored in a shared virtual address space (26) and applications (14). Each application capable of accessing the shared virtual address space (26).

21 Claims, 1 Drawing Sheet

CLUSTER-WIDE DATABASE SYSTEM

FIELD OF THE INVENTION

The present invention relates generally to the field of databases and more particularly to an object oriented cluster-wide in-memory database system.

BACKGROUND of the INVENTION

A large number of applications require high speed, real time access to large databases with response time requirements of only a few milliseconds to tens of milliseconds. These applications (e.g., call routing in telecommunication systems, internet name and data services, financial applications, automation control, etc.) cannot afford the performance latency of accessing data that is disk-resident or ships the data through interprocess communications. These applications also cannot afford the memory requirements of mapping or caching the data in each client application's process virtual address space. These applications often cannot be hosted on a single machine due to reliability and performance constraints.

Traditional relational database architectures and client-server database systems often use a database server process. The client applications ship queries and other database operations to the database server which processes the requests (e.g., SQL standard query language operations) and returns the results.

The vast majority of object-oriented client-server database systems are typically based on a data-shipping approach. Data items (in the form of pages or objects) are shipped from the database server to clients so that the query processing and application processing can be performed through programmatic interfaces that support navigation.

All client/server database systems incur the overhead of interprocess or network communications and the overhead of caching and accessing the data in pageable process virtual address space.

Objects in an object-orient database contain references to other objects. Usually, the on-disk representation of an object differs from the in-memory representation of the object because of the way the storage manager treats inter-object references. Some systems use object identifiers (OIDs) for both the in-memory and on-disk representations. Other systems use virtual memory pointers or addresses for both representations. Finally, there are systems that use OIDs for the on-disk representation and virtual memory pointers for the in-memory representation. These systems convert the OIDs to virtual memory pointers or addresses when they fetch the objects from disk. This is referred to as swizzling. Object-oriented databases that do not perform pointer swizzling, use the unique object identifier (OID) to lookup the actual memory location of an object whenever the OID is dereferenced. The lookup process generally involves a relatively expensive search of an in-memory table that must be performed on every object reference.

Object oriented databases generally supply the following functions to the application program: 1) The ability to lookup and maintain navigational entry points into the database. These entry points are called root; 2) The ability to open one or more databases; 3) The ability to allocate and free memory from the persistent heap; and 4) The ability to navigate through object references. In addition a persistent store object oriented database often allows C++ interfaces, query languages, database utilities and the ability to store meta-data in the database.

SUMMARY OF THE INVENTION

In accordance with one aspect, the present invention directed to a cluster-wide database system including a shared disk array comprising an object oriented database. A plurality of nodes are connected to the shared disk array. Each of the plurality of nodes include a copy of a portion of the object oriented database stored in a shared virtual address space and one or more applications. The applications are each capable of directly accessing the shared virtual address space. This database system allows real time access to large databases. The database system eliminates the requirement for memory mapping or caching of data in each client application process virtual space.

In accordance with another aspect, the present invention is directed to a method of operating a cluster-wide database. The method comprises the steps of loading a portion of an object oriented database, stored in a secondary memory, into a shared virtual address space on each of a plurality of nodes, running an application on at least one of the plurality of nodes, and accessing the shared virtual address space by the application.

In accordance with another aspect, the present invention is directed to a cluster-wide database system. The database system comprising a secondary memory including a database, the database comprising a plurality of objects, at least one of the plurality of objects having a pointer to another of the plurality of objects and a plurality of computers connected to the secondary memory. Each of the computers comprises a shared virtual address space containing a copy of a portion of the database, the database being defined by a plurality of pages, each of the plurality of pages have a page table entry, a state of the page table entry comprising either a modified state, a protected state, an unprotected state, an unprotected state or an invalid state, a plurality of applications each capable of accessing the shared virtual address space, a writer application capable of writing a database update to the shared virtual address space, and a database server capable of updating writes that occurred another of the plurality of computers.

The present invention is for an in-memory, peer-to-peer cluster-wide object oriented database suitable for high speed real-time database applications like call routing in the telecommunications industry, internet naming and data services, or automation control, etc.

DETAILED DESCRIPTION OF THE DRAWINGS

Figure 1:
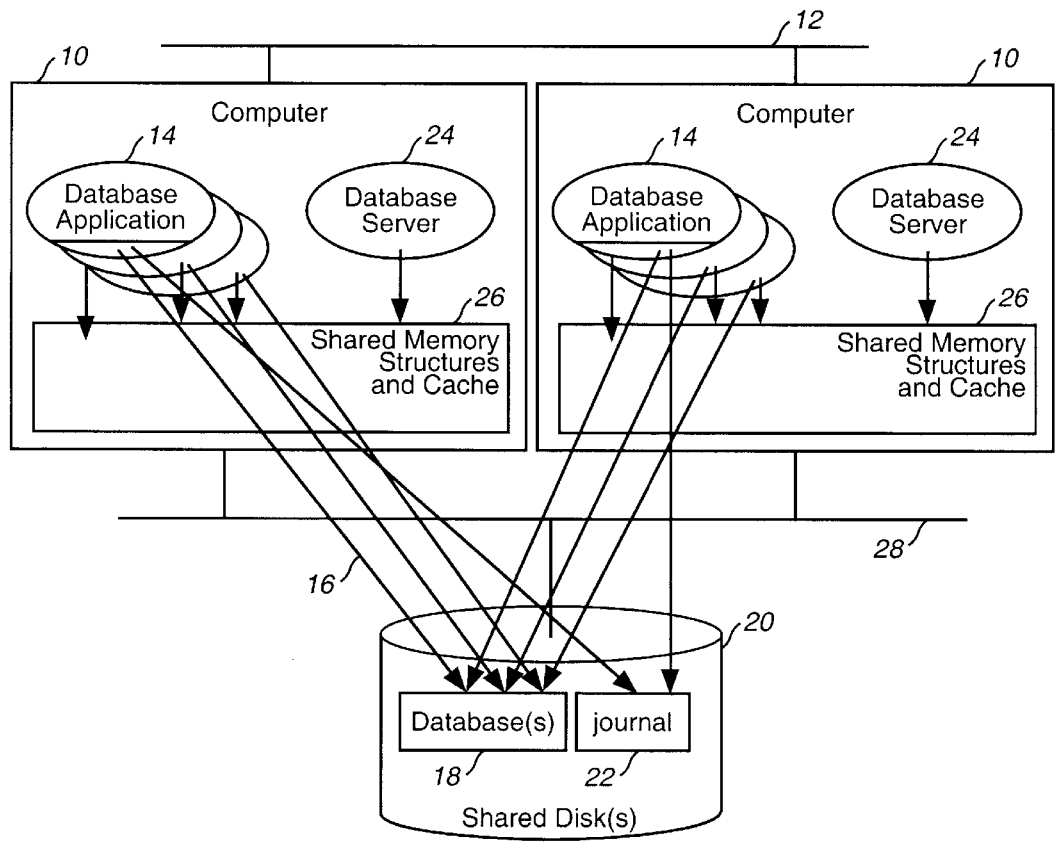
FIG. 1 is a block diagram of a cluster-wide database system.

The present invention encompasses an apparatus and method for a peer to peer cluster wide, real-time, shared memory, object oriented database. The apparatus has at least one shared permanent storage means for storing at least one database and journal log. A shared memory is used for caching the database and includes a system for detecting when data requested is not in memory. A processing unit controls the operation of the database. In one exemplary embodiment the system has a plurality of computers each having shared virtual memory address ranges, a distributed lock manager, communications network, and a common disk interconnect to a plurality of disks.

The apparatus operates by database applications, concurrently and directly, accessing or navigating using object IDs (OIDs) through a shared cache mapped in shared virtual address space. The apparatus translates OIDs to virtual addresses using a table lookup and checks to make sure the virtual address is a valid page before returning the virtual address to the application. Since clients may cache virtual addresses while in a transaction, the apparatus must also detect read access to an invalid virtual address and signal the application to perform a "fault" of the data from the database. The application using the apparatus interface reads pages of data directly from the database into the shared cache. The application changes the status of the pages read to valid and coordinates concurrent read collisions of the same page(s). The shared virtual address range for the cache may be mapped directly to physical memory, or the apparatus can perform virtual page aging and physical page replacement.

The apparatus must also detect write access to shared virtual memory by the application and perform checking, locking, journaling and adjusting the page protection to allow write access. When the page protection has to be adjusted the application instruction stream is repeated to allow the update. Once a write transaction commits, information about update pages are propagated to other nodes in the cluster and journaled on disk for atomic updating of the database.

An application program must open one or more databases before use. Each persistent database is generally stored as a single file on a disk. The first application to open or create a database maps the database into shared virtual address space on that node and records the database with the server to receive updates. Note the server is a daemon process that updates the local memory cache with updates from other nodes in the cluster and handles rollback of aborted local write transactions. The server is not a database server; it is a goal of the database to allow application programs to access data directly with little or no interprocess communications.

The database includes two types of information when open: information in the persistent store and data outside the persistent store. Information in the persistent store includes: the root, the free list, objects, etc. Data outside the persistent store includes the file-id, current extents, transaction numbers, etc. Data outside the persistent store is also stored in the shared memory.

Databases are opened for read and write access. Write access is checked when attempting to write to the database. Databases may also be opened for exclusive write, shared write or shared read access. Database access is always granted to the first accessing the database. Other process are then allowed to access the database depending on the access desired (read or write) and the sharing specified for the original process. Gaining exclusive access to a database can optimize locking and cluster wide updates.

Transactions establish the boundaries of atomic operations. All code that accesses a database must execute within a transaction. Updates to data within a transaction are atomic. Changes made after a transaction is committed are guaranteed to survive a system failure. Changes made during an aborted transaction are undone. Any changes in progress during a system failure is aborted and undone.

All persistent pointers are stored as object identifiers (OIDs). Object identifiers are offsets that must be translated to real virtual addresses before being dereferenced. An OID value of zero is undefined and can be used to check for invalid objects or ends of lists, etc. An object ID is converted to a virtual address when dereferenced.

The OIDs must have a database to translate to a real virtual address, and store a unique database number internally for this reason. The OIDs use the object offset and adds in the starting virtual memory address where the database is mapped in shared memory to calculate the virtual address. If a database is stored as multiple extents, a table look-up is performed.

A persistent object is simply one that is allocated in the database as opposed to the conventional (transient) heap, static area, or on the activation stack. Each database has its own persistent heap. Programs may also create normal transient objects using standard memory allocation routines or by using a transient database class. Like any heap management system, the database maintains data structures that recorded the free heap space known as the free list. These data structures are stored as persistent data in the database. Heap corruption detection facilities detect and aid in finding application bugs.

In C++ the global new and global delete operators are overloaded to receive a database class to allocated from. The operator now returns a persistent virtual address of the newly created object. This virtual address is assigned and translated to an OID when stored in the database.

When an application program gains access to a database, it starts a transaction and then requests a pointer to the "rooted" object. Every database has only one database root, and every object in the database must be navigable from this root. The application then proceeds to read through the database using OID traversal. Each OID is translated to a real virtual address when dereferenced. These virtual addresses may be used by the application in the transaction to improve performance when the same object is referenced more than once.

C++ classes that have virtual functions also include a "hidden pointer" that is invalid across program invocations and cannot be stored directly in the database. Virtual functions may be easily simulated in C++ and classes that simulate virtual calls can be stored in the database. Simulation of virtual functions is done by storing a type in the base class for each sub-class, and implementing the virtual function in the base class to down cast to the correct type and call the sub-class method.

The apparatus allocates and maps databases into shared virtual address space on each node in the cluster. One exemplary embodiment of the apparatus uses Open VMS, but other operating systems could be used. When there is enough physical memory available, no page faulting will occur. The invention uses pagewise virtual memory protections to detect read faults of invalid pages and keeps the most recently used pages in memory when doing page replacement. Object identifiers (OIDs—offsets into the database) are used and there is no pointer swizzling. The OIDs are converted into real memory locations before the object can be dereferenced. This limits the total database size to the size of usable virtual address space where the databases are mapped. In one exemplary embodiment the system is run using Open VMS on Alpha (microprocessor) as well as several other operating systems having 64 bit address space, so this is not a problem. Readers always see a consistent view of the database. Coordination between nodes in the cluster handle and allow for serialized writers anywhere in the cluster. Database changes are journaled for recovery. Modifications of databases are propagated to update the caches on all nodes in the cluster. A writer commits when it has been successfully written to the journal and all nodes in the cluster have received the modified pages or page differences to lock into their local cache. Pages are locked into the cache on each node in the cluster until the changes are applied to the database file and nodes have been informed that they may read the modified data from the permanent store. Since loading the database in memory is simply a matter of priming the cache, updates can commit while the cache is being loaded.

FIG. 1 illustrates a typical block diagram of the overall system configuration and major parts of the invention. The system includes of a plurality of computers (plurality of nodes) 10, connected by a network 12 or other communications path. The computers execute one or more database applications (plurality of applications) 14 each linked with the database software comprising the fault handler (page faulting system) and other routines, that open one or more channels 16 to one or more database files 18 on the disk (shared disk array, secondary memory) 20. Write applications open one or more channels 16 to journal files (journaling system) 22. The database server 24 handles rollback or rollforward for aborted applications and updates the shared memory cache 26 with updates from other systems sharing the database. Applications fault data directly into the shared memory (copy of a portion of the object oriented database) 26 where the data is accessed directly after translating OIDs to virtual addresses. Control information is also stored in shared memory 26. The computers 10 are connected to shared disks 20 by some form of disk interconnect 28, and applications and the database server opens channels 16 directly to data stored on these disks 20.

Readers start a read transaction and read the database stored in shared virtual address space 26 as if were their own transient memory. Readers may encounter pages that are in three possible states: unprotected pages, protected pages and invalid pages. An unprotected page can be read without causing an access fault. They are valid pages currently mapped to a physical memory page. A protected page (semi-least used page) will cause an access fault. Pages are protected periodically to check for recently used pages. The fault handler will unprotect the page and retry the instruction. An invalid page does not have valid contents. Invalid pages may or may not have a physical page assigned to them. These pages will cause an access fault when read. The fault handler is responsible for finding a physical page if needed, reading the data from the database for the virtual page, mapping the virtual address to the physical page used and retrying the instruction. This process is known as page replacement (page replacement routine).

Figure 2:
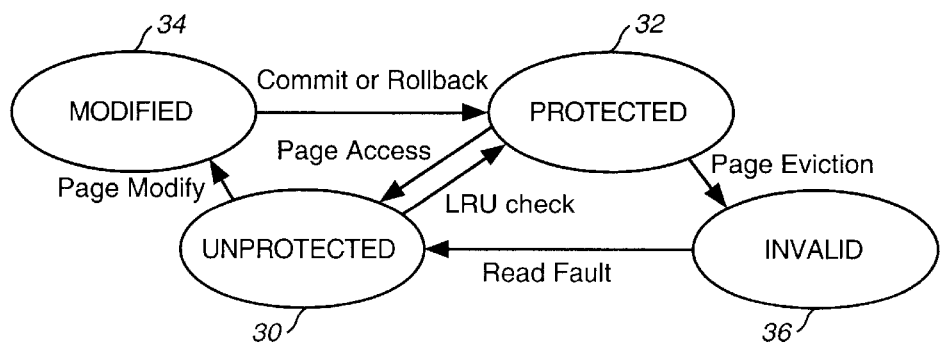
FIG. 2 is a page state transition diagram.

Page replacement is done using a semi-least recently used algorithm. A single pointer LRU PTE (least recently used page table entry pointer) is used to scan the PTEs (page table entries) that map the persistent store in a continuous loop. Each PTE may be in one of four possible states. FIG. 2 is a page state transition diagram. An unprotected page 30 is a page that has been accessed since the last loop of the LRU PTE pointer. This type of page is not a good candidate for page replacement. When the LRU PTE encounters a PTE in the unprotected state, the PTE is changed to protected and the LRU PTE pointer is advanced.

A protected page 32 is a page that has not been touched (accessed) since the LRU PTE has looped. This type of page is used for page replacement if it is not marked as locked. The PTE of a page used for page replacement is marked as invalid and the physical page is now available for use.

A modified page 34 is a page that is in the middle of a write process. Modified pages are committed but not yet stored in the backstore file and are stored as readable/writeable pages locked into memory or as invalid pages with the page stored on the modified page list. Modified pages are unlocked and changed to protected when the writer (writer application) has updated the backstore file. Unprotected pages may also be locked in memory to prevent paging for performance reasons or for use by in-memory databases.

An invalid page 36 is a page not yet assigned to a database or for use by guard pages. When there is a physical page for this virtual address it can be used, if not the LRU PTE pointer is simply advanced. Invalid pages always cause access violations. The access violation causes the page to be loaded if the page belongs to a database. Since the list of valid physical pages are stored in PTE's somewhere, invalid pages may be recording a physical page not currently being used.

These states are stored in the L3PTE (level 3 page table entry pointer) on the Alpha architecture in bits <31:16> which is reserved for software and in the user mode read/write enabled bits. As will be apparent to those skilled in the art other microprocessors may also be used. The Alpha microprocessor is representative of how one exemplary embodiment of the invention may be implemented. An unprotected or modified page has user read enabled. All other pages are user read disabled. A modified page has user write enabled. All other pages are user write disabled. Locked pages have bit 21 enabled. Invalid pages have bit 22 enabled. It is possible for an invalid page to have a valid PFN (Page Frame Number or Physical Page Number).

The page replacement routine executes in kernel mode. The first step in the routine is to perform a consistency check on all arguments. The second step is to determine if the virtual address has a non-zero PFN. When the PFN is non-zero a virtual address may have been assigned to the physical page and the process died before finishing the I/O (input/output). The page replacement process is complete.

When the PFN is zero, the interrupt priority level (IPL) is raised to the level that prevents process rescheduling. Next, a spinlock is acquired to protect against multiple modifications to the PTEs. The LRU PTE pointer is looped until a protected page is found. The PTE is changed to invalid and the PFN associated with PTE is cleared out. The desired page is stored and the PFN is stored in the new PTE. The modified PTEs are then flushed from the translation buffer (TB). Then the spinlock is dismissed and the IPL is lowered. This completes the page replacement routine.

The fault handler performs the following steps to fault a page. An I/O is queued for the physical page or the modified page list is checked for the page. Next, the page replacement routine is called to obtain a new physical page for the current virtual address and to store the data for the physical page. The PTE is changed from invalid to unprotected.

Applications share the same persistent cache for very high performance, but this demands synchronizing concurrent access. Writes are also readers and fault pages as above. An application that desires to modify the persistent store starts a write transaction. Starting a write transaction takes out a cluster wide lock to serialize all write transactions. The system has a strict multiple readers and single writer sharing policy. In other words multiple readers may read the data and a single writer may modify the data at any given time. Therefor, writers must block readers to perform atomic operations. As will be apparent to those skilled in the art other locking strategies could also be employed.

Attempts to modify persistent pages are trapped by the fault handler. The fault handler checks to make sure the database being modified is opened for write access and that a current write transaction is in progress. The fault handler then records the contents of the original page, page offset and file id in a journal. The fault handler next changes the page protection to allow the modify.

Modifications are shipped to other nodes in the cluster as a sequence of modified pages or page diffs (differences, database updates). All modifications must be stored on other nodes in the cluster either as locked pages in memory or kept on the modified list until these modifications have been made to the backstore file. Other nodes in the cluster update there local caches by obtaining an exclusive lock if the page is in physical memory it is assumed to have been accessed recently and the data is simply replaced or updated. If the page is not currently in physical memory the modifications are temporarily stored on the modify list in case readers attempt to page it. The data is removed from the modify list when the write transaction has been committed to the database file.

There are four levels of memory management. The physical memory management is the processes used when the shared virtual address space of the database is greater than the amount of physical memory. The processes used by the present invention in this situation include, performing demand paging and storing the most recently accessed pages in memory.

The global heap memory management process include maintaining a list of allocated or free pages. This list of free areas is stored in a linked list in non-paged pool. Each area may be guarded by an invalid page. The global heap is created in shared virtual address space.

The database memory management requires all allocations are aligned on longword boundaries and must be at least a quadword long. Allocations cannot be greater than an extent multiple or fall on an extent multiple boundary. A database includes a root page followed by multiple areas. The root page includes look-a-side lists for fixed size allocations. Separate free lists are maintained for each area to prevent allocations across an extent boundary. The database is a persistent heap.

Cluster memory management is used to increase locality of reference for objects that are accessed together. A cluster is a fixed length sub-heap.

Undo records of a transaction are maintained in main memory until the write transaction commits. Undo records of a transaction are discarded once the transaction has committed. A redo-only logging scheme is used for checkpointing the modified pages into the backstore file. The backstore file is modified only after all changes are safely written to a journal file and all nodes in the cluster have responded to the commit. This is achieved by using two-phase logging. In the first phase, all the changes made to the persistent store are written to the journal file, and a pre-commit record is written to indicate that the journal file is complete. The transaction is then sent to all nodes in the cluster for them to commit the transaction to their in memory cache. Once this phase is successfully executed, the writer commits.

A writer or lazy write process reads the journal file, updates the backstore to incorporate changes and informs nodes in the cluster that the backstore has been updated. If a crash occurs during the first phase, then the backstore has not been modified is in a consistent state. If the crash occurs during the second phase, the backstore may be in an inconsistent state, the journal file can be used to make the backstore consistent. Note that the Last phase may be re-done indefinitely.

When an application opens or takes out a write lock, the database system will check to see if the backstore needs to be recovered. When the backstore needs to be recovered, it is determined if the journal file is complete. When the journal file is not complete (i.e., it does not have the pre-commit record) the pages in memory may be modified, but the disk storage is consistent. As a result, the journal file is discarded and execution is resumed. When the journal file is complete, the second phase is restarted to recover to a consistent state after the crash. The journal file may then be discarded.

The write process involves the steps of a user program taking out a write transaction. A write transaction takes out cluster wide lock to serialize writers. The user program modifies one of more pages. The original page is saved along with the list of modified pages in an undo log in memory. The user program then commits the write transaction. This involves writing the modified pages to the journal file. A journal complete record is written to the journal file. The pages are committed to other nodes in the cluster. The write lock is removed. The pages are updated to the backstore. The pages are unlocked on nodes in the cluster. Finally, the pages are removed from the journal. New writers may not start until all local caches are correct. A crashed node reads and locks all pages found in the journal upon recovery.

Bootstrapping occurs in two cases. In one case the persistent store does not exist and an empty database on disk comprising an empty database header is created. When the persistent store does exist, the system opens the file and sets up the environment from the control information saved in the first few pages of the persistent store. As pages are referenced they will be faulted into physical memory.

The "server" is a daemon process that updates the local memory cache with updates from other nodes in the cluster and handles rollback of aborted local write transactions. The server is not a database server. It is a goal of the database to allow application programs to access data directly with little or no interprocess communications.

The server is run as a detached process at boot time and initializes the database environment when run. When the database is restarted after a system crash, recovery activities have to be performed to load the journal into memory before databases are allowed to be opened. The journaling stores any transactions committed but not yet stored in the backstore file.

The application keeps an undo log, for local write transactions, resident in shared memory until the transaction commits. If the write process aborts or rolls back the transaction, the server undoes the write transaction in the local memory cache. It does this by taking out an exclusive lock on the memory database and replacing the original pages from the in-memory before imaging journal. If a local write transaction commits, but the write process dies before finishing, the server rolls forward the transaction notifying all the other servers in the cluster of the transaction commit. The server uses a node specific lock to monitor write transactions in progress.

For remote write transactions, the server takes out a null lock to tell other servers in the cluster that this node has a database cache that needs to be updated on a write transaction by other nodes. If the server is shutdown or crashes, it releases the lock. The server keeps track of the last transaction number applied to the local memory cache and reports an error and restarts if missing transactions are detected.

The server will receive updates to all files being modified on this cluster. If the file is not opened on this node, it must save up the journal records until it is notified that the committed transaction has been applied to the backstore file. Readers will check the list of modified pages that are committed but not yet applied to the backstore file when faulting. Pages in this list may be faulted into memory. If the updates are to a file opened on this node and the page exists in physical memory, the page is moved into physical memory, locked and removed from the modified page list.

When the server is notified that the backstore file has been updated from the journal it can unlock pages in physical memory or release the page from the modified page list.

The present invention allows real-time access to large database by multiple users. The present invention accomplishes this by not shipping queries and other database operations through a central server. A number of other features are needed to make this work effectively.

The methods described herein may be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A cluster-wide database system comprising:
    a shared disk array including an object oriented database; and
    a plurality of nodes connected to the shared disk array, each of the plurality of nodes comprising:
        a copy of a portion of the object oriented database stored in a shared virtual address space; and
        a plurality of applications each capable of accessing the shared virtual address space.

2. The cluster-wide database system of claim 1, further including a page faulting system capable of faulting a page of memory to the shared virtual address space requested by one of the plurality of applications and not presently in the shared virtual address space.

3. The cluster-wide database system of claim 2, further including a page replacement routine as part of the page faulting system.

4. The cluster-wide database system of claim 1, further including a database server for each of the plurality of nodes.

5. The cluster-wide database system of claim 4, wherein each of the database servers are connected together.

6. The cluster-wide database system of claim 5, further including a writer application on at least one of the plurality of nodes, the writer application capable of updating a part of the shared virtual address space.

7. The cluster-wide database system of claim 6, further including a journaling system connected to the shared disk array.

8. The cluster-wide database system of claim 1, wherein the plurality of nodes are a plurality of computers.

9. A method of operating a cluster-wide database comprising the steps of:
    (a) loading a portion of an object oriented database, stored in a secondary memory, into a shared virtual address space on each of a plurality of nodes;
    (b) running an application on at least one of the plurality of nodes; and
    (c) accessing the shared virtual address space by the application.

10. The method of claim 9, wherein step (c) further includes the step of:
    (c1) when the application attempts to access a page of memory that is not in the shared virtual address space, faulting the page of memory from the object oriented database in the secondary memory.

11. The method of claim 10, further including the step of:
    (c2) evicting a semi-least used page from the shared virtual address space.

12. The method of claim 9, further including the steps of:
    (d) receiving a page of memory for the object oriented database at a writer application in one of the plurality of nodes;
    (e) writing the page of memory to the shared virtual address space.

13. The method of claim 12, further including the steps of:
    (f) detecting that the page of memory has been written to the shared virtual address space;
    (g) transmitting a database update to a plurality of other database servers in the other of the plurality of nodes.

14. The method of claim 13, further including the step of:
    (h) transmitting the database update to the secondary memory.

15. The method of claim 9, wherein step (c) further includes the steps of:
    (c1) setting a page table entry to an unprotected state for each of a plurality of pages forming the shared virtual address space;
    (c2) setting a page table entry to an invalid state for each of a plurality of pages that are not stored in the shared virtual address space.

16. The method of claim 15, further including the steps of:
    (c3) when one of the plurality of applications attempts to read from one of the plurality of pages having the page table entry set to the invalid state, faulting the one of the plurality of pages from the secondary memory;
    (c4) changing the page table entry for the one of the plurality of pages to the unprotected state.

17. The method of claim 16, wherein step (c3) further includes the steps of:

i) determining a state of a page table entry pointed to by a least recently used page table entry pointer;

ii) when the state of the page table entry is protected, the state of the page table entry is changed to invalid;

iii) the one of the plurality of pages is stored at a physical frame number associated with the page table entry pointer.

18. The method of claim 17, further including the steps of:

iv) when the state of the page table entry pointer is unprotected, the state of the page table entry is changed to protected and the least recently used page table entry pointer is moved to a next page table entry.

19. The method of claim 15, further including the step of:

(c3) when a page has been modified on one the plurality of nodes but not stored, changing the page table entry for the page to a modified state.

20. A cluster-wide database system including:

a secondary memory including a database, the database comprising a plurality of objects, at least one of the plurality of objects having a pointer to another of the plurality of objects; and a plurality of computers connected to the secondary memory, each of the computers comprising:

a shared virtual address space containing a copy of a portion of the database, the database being defined by a plurality of pages, each of the plurality of pages have a page table entry, a state of the page table entry comprising either a modified state, a protected state, an unprotected state or an invalid state;

a plurality of applications each capable of accessing the shared virtual address space;

a writer applicaton capable of writing a database update to the shared virtual address space; and a database server capable of updating writes that occured another of the plurality of computers.

21. The system of claim 20, wherein the database server for each of the plurality of computers is connected to at least one of the other database servers.

\* \* \* \* \*